(12) United States Patent
Xia

(10) Patent No.: US 8,731,601 B2
(45) Date of Patent: May 20, 2014

(54) ENERGY SAVING MANAGEMENT METHOD FOR BASE STATION, APPARATUS AND SYSTEM

(75) Inventor: Haitao Xia, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 135 days.

(21) Appl. No.: 13/450,623

(22) Filed: Apr. 19, 2012

(65) Prior Publication Data

US 2012/0208598 A1    Aug. 16, 2012

Related U.S. Application Data

(63) Continuation of application No. PCT/CN2010/077638, filed on Oct. 11, 2010.

(30) Foreign Application Priority Data

Oct. 19, 2009    (CN) .......................... 2009 1 0208230

(51) Int. Cl.
| | |
|---|---|
| *H04B 7/00* | (2006.01) |
| *H04B 1/04* | (2006.01) |
| *H04W 40/00* | (2009.01) |
| *H04M 1/00* | (2006.01) |

(52) U.S. Cl.
USPC ..................... 455/522; 455/114.3; 455/127.1; 455/446; 455/513; 455/561; 455/574

(58) Field of Classification Search
USPC .......................................................... 455/561
See application file for complete search history.

(56) References Cited

U.S. PATENT DOCUMENTS

| | | | |
|---|---|---|---|
| 6,347,226 B1 | 2/2002 | Virtanen | |
| 2004/0185908 A1* | 9/2004 | Hur | ............................. 455/561 |
| 2009/0097426 A1* | 4/2009 | Yin | ............................. 370/311 |
| 2009/0279474 A1* | 11/2009 | Chou et al. | .................... 370/315 |
| 2010/0323647 A1* | 12/2010 | Ryu et al. | .................. 455/127.5 |
| 2013/0051244 A1* | 2/2013 | Bodog et al. | ............... 370/241.1 |

FOREIGN PATENT DOCUMENTS

| | | |
|---|---|---|
| CN | 1731879 | 2/2006 |
| CN | 101080047 | 11/2007 |
| CN | 101778458 | 7/2010 |
| CN | 101835247 | 9/2010 |
| CN | 101841859 | 9/2010 |

(Continued)

OTHER PUBLICATIONS

International Search Report for PCT/CN2010/077638 mailed Jan. 6, 2011.

(Continued)

*Primary Examiner* — Inder Mehra
(74) *Attorney, Agent, or Firm* — Staas & Halsey LLP

(57) ABSTRACT

An energy saving (ES) management method for a base station includes: An integration reference point manager (IRPManager) initiates an ES enable/disable procedure or an ES activation/resumption procedure to an integration reference point agent (IRPAgent), where the ES enable/disable procedure is used to allow or prohibit an ES operation on the base station or a cell, and the ES activation/resumption procedure is used to cause the base station or the cell to go into or go out of an ES state. The technical solutions according to the embodiments of the present invention enable operators to perform unified management on an ES procedure for a base station at a base station level or a cell level.

26 Claims, 4 Drawing Sheets

(56) References Cited

FOREIGN PATENT DOCUMENTS

| EP | 1830515 | 9/2007 |
|---|---|---|
| JP | 2002-500845 | 1/2002 |
| KR | 10-2008-0074698 | 8/2008 |

OTHER PUBLICATIONS

3GPP TS 32.522, V0.2.0, "3$^{rd}$ Generation Partnership Project; Technical Specification Group Services and System Aspects; Telecommunication management; Self-Optimization OAM; Stage 2 descriptions", Release 9, Jul. 2009, pp. 1-13.

3GPP TR 32.826, V0.3.0, "3$^{rd}$ Generation Partnership Project; Technical Specification Group Services and System Aspects; Telecommunication management; Study on Energy Savings Management", Release 9, Jul. 2009, pp. 1-17.

Written Opinion of the International Search Authority mailed Jan. 6, 2011 issued in corresponding International Patent Application No. PCT/CN2010/077638.

Chinese Office Action issued Aug. 3, 2012 in corresponding Chinese Patent Application No. 200910208230.6.

3GPP TS 32.150 V8.3.0, "3$^{rd}$ Generation Partnership Project; Technical Specification Group Services and System Aspects; Telecommunication management; Integration Reference Point (IRP) Concept and definitions", Release 8, Mar. 2009, pp. 1-24.

3GPP TR 32.826 V0.3.0, "3$^{rd}$ Generation Partnership Project; Technical Specification Group Services and System Aspects; Telecommunication management; Study on Energy Saving Management", Release 9, Jul. 2009, pp. 1-17.

3GPP TR 32.551 V1.0.0, "3$^{rd}$ Generation Partnership Project; Technical Specification Group Services and System Aspects; Telecommunication management; Energy Saving Management (ESM); Concepts and requirements", Release 10, Sep. 2010, pp. 1-22.

Extended European Search Report dated Jun. 26, 2012 issued in corresponding European Patent Application No. 10824440.1.

European Office Action mailed Mar. 27, 2013 for corresponding European Application No. 10824440.1.

Japanese Office Action mailed Sep. 10, 2013 in corresponding Japanese Application No. 2012-534528.

* cited by examiner

ENERGY SAVING MANAGEMENT METHOD FOR BASE STATION, APPARATUS AND SYSTEM

CROSS-REFERENCE TO RELATED APPLICATIONS

This application is a continuation of International Application No. PCT/CN2010/077638, filed on Oct. 11, 2010, which claims priority to Chinese Patent Application No. 200910208230.6, filed on Oct. 19, 2009, both of which are hereby incorporated by reference in their entireties.

FIELD OF THE INVENTION

The present invention relates to the field of base station energy saving (ES), and in particular, to an ES management method for a base station, an apparatus and a system.

BACKGROUND OF THE INVENTION

Today, conventional resources are increasingly in short supply and energy prices are continuously rising, so that operators have to decrease their operating costs through ES and emission reduction of communication devices. Energy consumption of base stations accounts for a large percentage of energy consumption of a mobile communication network, and is a key target of the operators for the ES and emission reduction.

There are many ways for base station ES, for example, producing an ES-type base station through innovation in hardware technologies, using an outdoor base station, reducing base station sites through network planning, and using renewable energy (solar energy and wind energy). An ES scenario discussed in the present invention is a dynamically self-adaptive ES procedure for a base station, that is, by monitoring a load status or service traffic of a network, in the case of low load, energy-consuming components of the base station are turned off and the base station goes into an ES state, and in the case of high load, these components are turned on again, and the base station goes out of the ES state. However, during the process of implementing the present invention, the inventor discovers that the prior art has at least the following problems:

A triggering condition of the current ES operation for a base station is limited to the monitoring and decision on the load status of its cells by the base station itself, so that the operators are unable to deploy an ES strategy for the base station from the perspective of overall load statistics or performance status of the network.

SUMMARY OF THE INVENTION

In order to solve the problem that currently operators are unable to deploy an ES strategy for a base station from the perspective of overall load statistics or performance status of a network, the present invention provides an ES management method for a base station, an apparatus and a system.

According to one aspect, the present invention provides an ES management method for a base station, where the method includes: initiating, by an integration reference point manager, IRPManager, an ES enable/disable procedure or an ES activation/resumption procedure to an integration reference point agent, IRPAgent, where the ES enable/disable procedure is used to allow or prohibit an ES operation on a base station or a cell; the ES activation procedure is used to cause the base station or the cell to go into an ES state while the ES resumption procedure is used to cause the base station or the cell to go out of the ES state.

According to another aspect, based on the foregoing ES management method for a base station, the present invention provides an integration reference point manager (IRPManager), the IRPManager includes a processor and an interface. The processor is configured to initiate an ES enable/disable procedure or an ES activation/resumption procedure to an integration reference point agent (IRPAgent), where the ES enable/disable procedure is used to allow or prohibit an ES operation on a base station or a cell, and the ES activation/resumption procedure is used to cause the base station or the cell to go into or go out of an ES state. The interface is a northbound interface (Itf-N) configured to communicate with the IRPAgent.

According to another aspect, based on the foregoing ES management method for a base station, the present invention provides a network management system, where the system includes: an IRPManager and an IRPAgent, where management communication is performed between the IRPManager and the IRPAgent through a northbound interface, Itf-N, and the IRPManager is configured to initiate an ES enable/disable procedure or an ES activation/resumption procedure to the IRPAgent; the ES enable/disable procedure is used to allow or prohibit an ES operation on a base station or a cell; and the ES activation procedure is used to cause the base station or the cell to go into an ES state while the ES resumption procedure is used to cause the base station or the cell to go out of the ES state.

The foregoing technical solutions of the embodiments of the present invention enable the operators to perform unified management on an ES procedure for the base station at a base station level or a cell level, and thus enhances reliability and accuracy of an original ES operation triggering decision performed by the base station itself, so that the operators are provided with network-wide base station ES monitoring and base station ES strategy setting capabilities, which helps the operators to actively control the impact of the ES operation of the base station on the performance of the network.

BRIEF DESCRIPTION OF THE DRAWINGS

To make the technical solutions of the embodiments of the present invention clearer, accompanying drawings required to be used in the description of the embodiments are briefly described below.

DETAILED DESCRIPTION OF THE EMBODIMENTS

Figure 1:
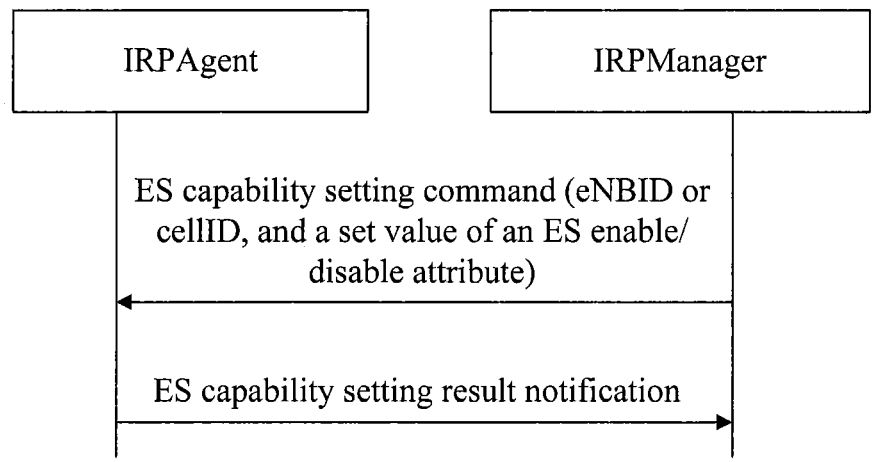
FIG. 1 is a message interaction diagram of an ES enable/disable attribute setting operation according to an embodiment of the present invention.

The technical solutions of the embodiments of the present are described clearly and completely below with reference to the accompanying drawings in the embodiments of the present invention.

Before the description of the embodiments of the present invention, a network management system, namely an OAM (Operations, Administration and Maintenance, operations, administration and maintenance) system is described firstly.

The OAM system provides operation, maintenance, and administration functions for a network. Referring to an ITU-T telecommunication management network model, interactive roles of a 3GPP management procedure are divided into an integration reference point manager (IRPManager) and an integration reference point agent (IRPAgent), where the IRPManager functions as a network manager, which is responsible for the operation, maintenance, and administration of the entire network; and the IRPAgent functions as a network element manager, which is responsible for the operation, maintenance, and administration of a certain type of devices in the network. A management interface between the IRPManager and the IRPAgent is referred to as an Itf-N (namely, a northbound interface). In the Itf-N interface, functional logical entities of some integration reference points (integration reference point, IRP), such as a basic configuration management integration reference point (Basic CM IRP), a bulk configuration management integration reference point (Bulk CM IRP), and a notification integration reference point (Notification IRP), are defined. Through functions provided by these integration reference points, the IRPAgent provides network management services for the IRPManager.

An ES management method for a base station according to the embodiment of the present invention includes: initiating, by an IRPManager, an ES enable/disable procedure or an ES activation/resumption procedure to an IRPAgent, where the ES enable/disable procedure is used to allow or prohibit an ES operation on a base station or a cell; and the ES activation procedure is used to cause the base station or the cell to go into an ES state while the ES resumption procedure is used to cause the base station or the cell to go out of the ES state.

Specifically, the IRPManager may initiate the ES enable/disable procedure or the ES activation/resumption procedure to the IRPAgent according to a strategy of an operator.

An ES management procedure for a base station is described in detail below with reference to an operator's ES strategy for the base station.

(I) ES Enable/Disable

Through the ES enable/disable procedure initiated by the IRPManager, an ES enable/disable attribute of the base station or the cell may be set, thus allowing or prohibiting an ES operation on the base station or the cell. An IRP message sent by the IRPManager carries an ES enable/disable attribute (such as isEnergySavingAllowed) information element (IE), where the IE is used to identify whether an ES operation on the base station or the cell is allowed. For example, the IE may take a Boolean value: True or False, where True denotes that an ES operation on the base station or the cell is allowed, while False denotes that an ES operation on the base station or the cell is not allowed; or the IE may take a value 1 or 0, where 1 denotes an ES operation on the base station or the cell is allowed, while 0 denotes an ES operation on the base station or the cell is not allowed. By using this IE, the network management maintenance staff of the operator may perform an ES operation enable/disable setting at a base station level or a cell level.

Regarding a strategy for setting the ES enable/disable attribute, the operator may determine and set the ES enable/disable attribute of the base station or the cell according to network planning data of the base station or the cell at an initial deployment stage or network optimization data of the base station or the cell after the base station or the cell has been put into operation for a certain period. The ES strategy that the operator may take into consideration before setting the ES enable/disable attribute for the base station or the cell includes at least the following aspects: whether service capability (such as type, rate and so on) of the base station or the cell is provided by another base station or cell of the same coverage; and for an inter-system deployment environment (a same area is covered by wireless technologies of different systems), whether a service rate decrease is allowed for a specific period of time (for example, a decrease from an LTE data rate to a UMTS data rate).

According to the definition of an Itf-N IRP operation in the current 3GPP network management specification, the ES enable/disable procedure may be initiated by using the following two manners.

Manner 1: The IRPManager sends ES enable/disable attribute information to the IRPAgent through the Itf-N, where a set value of the ES enable/disable attribute is carried in a dedicated ES operation command. For example, the IRPManager sends a dedicated ES capability setting command (such as SetESCapability) carrying the set value (such as True or False, or 1 or 0) of the ES enable/disable attribute (such as isEnergySavingAllowed) at the Itf-N, where the ES capability setting command also includes a base station identity (eNBID) or a cell identity (cellID). The IRPManager receives a notification returned by the IRPAgent that an ES enable/disable setting operation on the base station or the cell is completed. The interaction procedure between the IRPManager and the IRPAgent is as shown in FIG. 1.

Manner 2: An ES enable/disable attribute (such as isEnergySavingAllowed) is added for a managed object class such as a base station function class (such as eNBfunction) or a generic cell class (such as eUTRANGenericCell) at the Itf-N, and the IRPManager sets this attribute through a conventional Basic CM IRP or Bulk CM IRP operation. For example: a managed object attribute setting (such as setMOAttributes) operation is used to carry the set value of the ES enable/disable attribute in a modification list (such as modificationList) message parameter. For example, reference may be made to Table 1 for the definition of the ES enable/disable attribute.

TABLE 1

ES enable/disable attribute

| Attribute Name | Definition | Legal Value |
| --- | --- | --- |
| isEnergySavingAllowed | This attribute is used to identify whether an ES operation on the base station or the cell is allowed or prohibited. | Set value {True, False} or {1, 0}; True or 1: The ES operation on the base station or the cell is allowed; False or 0: The ES operation on the base station or the cell is prohibited. |

(II) ES Effective Period

The IRPManager may set an ES effective period attribute for the base station or the cell. For example, an IRP message sent by the IRPManager carries an ES effective period IE, where a value of the IE is a period list including start time and end time. The IE is used to identify an effective period for an ES operation on the base station or the cell, where the effective period for the ES operation is set by the operator according to a certain ES time strategy.

For example, when the ES enable/disable attribute of the base station or the cell is set to enabled (for example, the ES enable/disable attribute is set to True or 1), the IRPManager may further send an ES effective period of the base station or the cell to the IRPAgent. However, if the ES enable/disable attribute of the base station or the cell is set to disabled (for example, the ES enable/disable attribute is set to False or 0), the ES effective period attribute of the base station or the cell is not allowed to be set any more.

Of course, the network management system may also not set the ES enable/disable attribute of the base station or the cell in advance, and instead, the IRPManager sends the ES effective period of the base station or the cell to the IRPAgent; when the ES effective period is a valid time value, it denotes that an ES operation on the base station or the cell is allowed; and when the ES effective period is not a valid time value, it denotes an ES operation on the base station or the cell is prohibited.

Before the ES effective period attribute of the base station or the cell is set, the following two ES strategies may be taken into consideration.

Strategy 1: A Base Station/Cell Non-Peak Period Based on OAM System Load Statistics 24 hours each day (00:00:00-23:59:59) is used as a load statistics measurement period for dividing the non-peak period of the base station/cell. The IRPManager performs a judgment based on historical load statistics data of the base station/cell and an internal load threshold and forms start time or end time of the non-peak period. The time is represented in the form of (year-month-day, hour:minute:second), and if the "year-month-day" is omitted, it means each day by default. For example, (01:00:00, 06:00:00) denotes that the period from 1:00 a.m. to 6:00 a.m. each day is a non-peak period of the base station or the cell.

Strategy 2: A Non-Busy Period of a Base Station/Cell in Hot Coverage

For a base station/cell in hot coverage, for example, a stadium, a concert hall, or an exhibition hall, a load during a non-performance/playing period (namely, a non-busy period) may be considered to be approaching zero. The operator may obtain a timetable of the performance/playing periods, and set, through the IRPManager, the non-busy period of the base station or the cell in the hot coverage as an effective period for the ES operation to a corresponding base station or cell object. For example, the ES effective period attribute of the base station/cell in the hot coverage within one month is set to be {(Ts, Ts 1), (Te 1, Ts 2), (Te 2, Ts 3), . . . , (Te n−1, Ts n), (Te n, Te)}, where Ts i and Te i are start/end time of a performance/playing period i, Ts is start time of a whole statistics period, Te is end time of the whole statistics period, and the time may be represented in the form of year-month-day, hour:minute:second.

According to the definition of an Itf-N IRP operation in the current 3GPP network management specification, the following two ways may be used to complete the setting operation on the ES effective period attribute based on the statistics of the foregoing two strategies.

Figure 2:
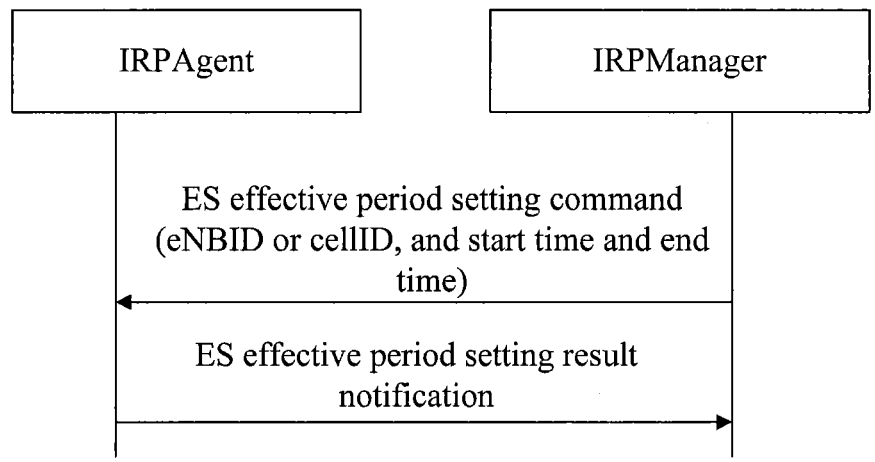
FIG. 2 is a message interaction diagram of an ES effective period attribute setting operation according to an embodiment of the present invention.

Manner 1: The setting of the ES effective period attribute is implemented through a dedicated ES operation command at the Itf-N, and the set value of the ES effective period attribute is carried in the dedicated ES operation command. For example, the IRPManager sends a dedicated ES effective period attribute setting command (such as SetESPeriod) to the IRPAgent at the Itf-N, where the ES effective period attribute setting command carries an eNBID or a cellID, and start time and end time. The IRPManager receives a notification returned by the IRPAgent that the ES effective period attribute setting operation on the base station or the cell is completed. The interaction procedure between the IRPManager and the IRPAgent is as shown in FIG. 2.

Manner 2: An ES effective period attribute (such as EnergySavingEffectivePeriod) is added for a base station function class (such as eNBfunction) or a generic cell class (such as eUTRANGenericCell) at the Itf-N, and the IRPManager sets this attribute through a Basic CM IRP or Bulk CM IRP operation. For example, a managed object attribute setting (such as setMOAttributes) operation is used to carry the set value of the ES effective period attribute in a modification list (such as modificationList) message parameter. For example, reference may be made to Table 2 for the definition of the ES effective period attribute.

TABLE 2

ES effective period attribute

| Attribute Name | Definition | Legal Value |
| --- | --- | --- |
| EnergySavingEffectivePeriod | This attribute is used to identify an ES effective period of the base station or the cell. | List {start time, end time}, The time is represented in the form of (year-month-day, hour:minute:second). |

(III) ES Activation

An ES activation procedure initiated by the IRPManager is used to cause the base station or the cell to go into an ES state.

A decision on the ES activation may be directly performed by the IRPManager according to an ES operation strategy, and a specific ES action executed by the base station is set by the base station itself, for example: closing a carrier frequency of the cell or closing a broadcast control channel (BCCH) of the base station. The OAM system may not set the specific ES action of the base station, but may select a control object (such as the base station or the cell) on which an ES operation is implemented.

According to the definition of an Itf-N IRP operation in the current 3GPP network management specification, the ES activation operation may be completed by using the following two manners.

Figure 3:
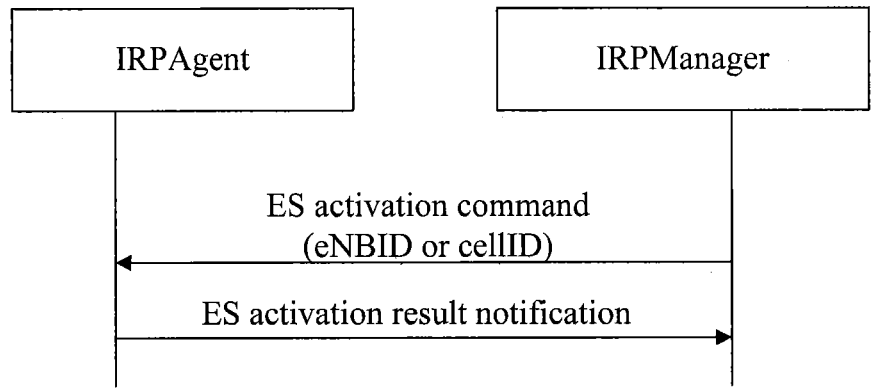
FIG. 3 is a message interaction diagram of an ES activation operation according to an embodiment of the present invention.

Manner 1: The IRPManager sends a dedicated ES activation command (such as ESActivate) to the IRPAgent at the Itf-N, where the ES activation command message carries an eNBID or a cellID. The IRPManager receives a notification returned by the IRPAgent that an ES activation operation on the base station or the cell is completed. The interaction procedure between the IRPManager and the IRPAgent is as shown in FIG. 3.

Manner 2: An ES activation attribute (such as EnergySavingActivate) is added for a base station function class (such as eNBfunction) or a generic cell class (such as eUTRANGenericCell) at the Itf-N, and the IRPManager sets this attribute through a conventional Basic CM IRP or Bulk CM IRP operation. For example, a managed object attribute setting (such as setMOAttributes) operation is used to carry the set value of the ES activation attribute in a modification list (such as modificationList) message parameter. For example, reference may be made to Table 3 for the definition of the ES activation attribute. The ES activation attribute is set by the IRPManager and is transparently transmitted to the base station through the IRPAgent. The base station performs a corresponding ES activation operation according to the set value (True or 1) of the ES activation attribute.

TABLE 3

ES activation attribute

| Attribute Name | Definition | Legal Value |
| --- | --- | --- |
| EnergySavingActivate | This attribute is used to identify whether to perform an ES activation operation on the base station or the cell. | Set value {True, False} or {1, 0}; True or 1: to perform an ES activation operation on the base station or the cell; False or 0: not to perform an ES activation operation on the base station or the cell. |

(IV) ES Resumption

An ES resumption procedure initiated by the IRPManager is used to cause the base station or the cell to go out of an ES state.

A decision on the ES resumption may be directly performed by the IRPManager according to an ES operation strategy, or a base station or a cell in a non-ES state, where the base station or the cell in the non-ES state is adjacent to the base station or the cell in an ES state, may notify the OAM system of a load update status of the same coverage, and then the IRPManager initiates an ES resumption procedure.

The specific ES resumption action performed by the base station or the cell may be set by the base station itself, for example, opening a carrier frequency of the cell or opening a BCCH channel of the base station. The OAM system may not set the specific ES resumption action of the base station or the cell, but may select a control object (such as the base station or the cell) on which an ES resumption operation is implemented.

According to the definition of an Itf-N IRP operation in the current 3GPP network management specification, the ES resumption operation may be completed by using the following two manners.

Figure 4:
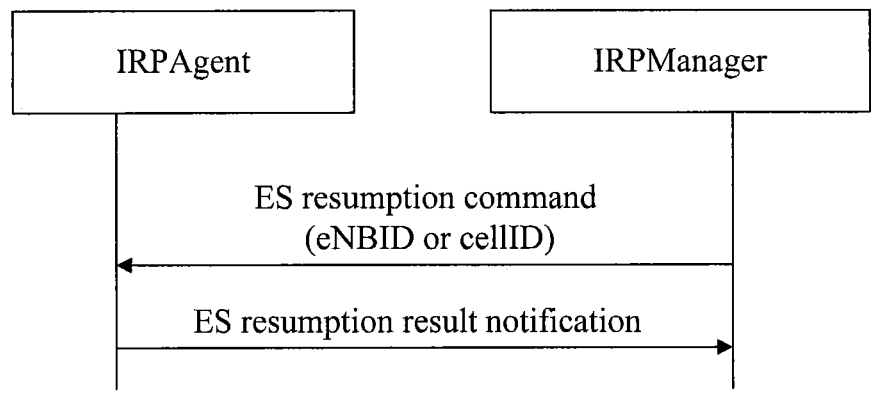
FIG. 4 is a message interaction diagram of an ES resumption operation according to an embodiment of the present invention.
Figure 5:
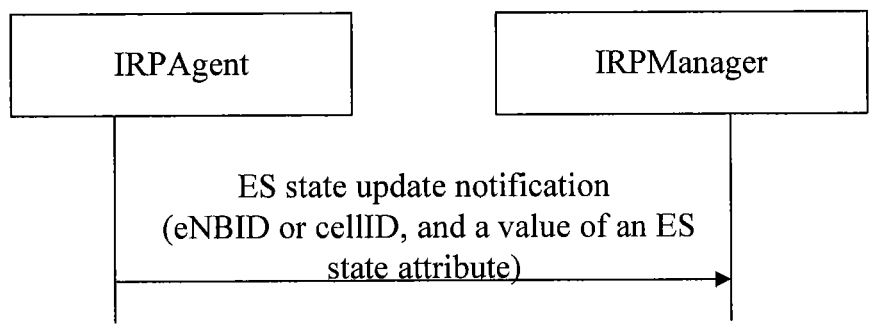
FIG. 5 is a message interaction diagram of a Notification about ES state update according to an embodiment of the present invention.

Manner 1: The IRPManager sends a dedicated ES resumption command (such as ESResume) to the IRPAgent at the Itf-N, where the ES resumption command message carries an eNBID or a cellID. The IRPManager receives a notification returned by the IRPAgent that an ES resumption operation on the base station or the cell is completed. The interaction procedure between the IRPManager and the IRPAgent is as shown in FIG. 4.

Manner 2: An ES resumption, attribute (such as EnergySavingResume) is added for a base station function class (such as eNBfunction) or a generic cell class (such as eUTRANGenericCell) at the Itf-N, and the IRPManager sets this attribute through a conventional Basic CM IRP or Bulk CM IRP operation. For example, a managed object attribute setting (such as setMOAttributes) operation is used to carry the set value of the ES resumption attribute in a modification list (such as modificationList) message parameter. For example, reference may be made to Table 4 for the definition of the ES resumption attribute. The ES resumption attribute is set by the IRPManager and is transparently transmitted to the base station through the IRPAgent. The base station performs a corresponding ES resumption operation according to the set value (True or 1) of the ES resumption attribute.

TABLE 4

ES resumption attribute

| Attribute Name | Definition | Legal Value |
| --- | --- | --- |
| EnergySavingResume | This attribute is used to identify whether to perform an ES resumption operation on the base station or the cell. | Set value {True, False} or {1, 0}; True or 1: to perform an ES resumption operation on the base station or the cell; False or 0: not to perform an ES resumption operation on the base station or the cell. |

(V) Notification About ES State Update

When the base station or the cell goes into the ES state or goes out of the ES state, the IRPAgent sends a notification about ES state update of the base station or the cell to the IRPManager. Specifically, the IRPAgent notifies the IRPManager of the current ES state of the base station or the cell, where an IRP message sent by the IRPAgent carries an ES state attribute IE. This IE is used to identify the current ES state of the base station or the cell. For example, this attribute may take a Boolean value True or False, where True denotes that the base station or the cell has gone into the ES state, while False denotes that the base station or the cell has gone out of the ES state; or this attribute may take a value 1 or 0, where 1 denotes that the base station or the cell has gone into the ES state, while 0 denotes that the base station or the cell has gone out of the ES state.

According to the definition of an Itf-N IRP operation in the current 3GPP network management specification, the ES state update notification operation may be completed by using the following two manners.

Figure 6:
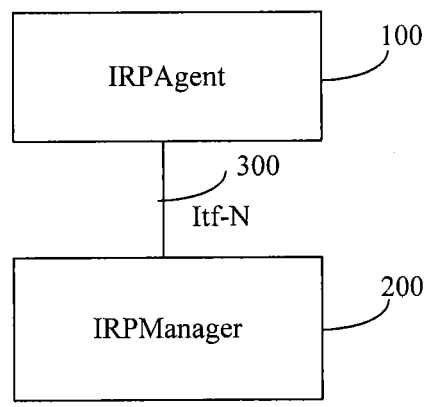
FIG. 6 is a schematic structural diagram of a network management system according to an embodiment of the present invention.

Manner 1: The IRPAgent sends a dedicated notification about ES state update (such as NotifyESStateUpdate) to the IRPManager at the Itf-N, where the notification about ES state update message carries an eNBID or a cellID, and a value (such as True or False, or 1 or 0) of the ES state attribute. The interaction procedure between the IRPManager and the IRPAgent is as shown in FIG. 6.

Manner 2: The IRPAgent sends an Notification about ES state update to the IRPManager through a notification integration reference point (Notification IRP) at the Itf-N.

As an embodiment of the present invention, after the IRPManager initiates an ES management procedure to the IRPAgent, the base station triggers the ES operation according to its own ES operation triggering conditions. For example:

If the base station sets the ES effective period attribute according to the ES enable/disable procedure initiated by the network management system, then in the set ES effective period, if the load of the base station or a cell controlled by the base station is less than a preset threshold, the base station performs an ES activation operation and goes into an ES state, and if the load of the base station or the cell controlled by the base station is not less than the preset threshold, the base station does not perform the ES activation operation and does not go into the ES state; or If the load of the base station or the cell controlled by the base station rises to a level higher than the preset threshold, or the ES effective period of the base station or the cell controlled by the base station reaches the end time, the base station performs an ES resumption operation and goes out of the ES state.

In another embodiment, after the IRPManager initiates an ES activation/resumption procedure, the base station immediately triggers an ES activation/resumption operation on the base station or the cell, without taking the base station's own ES operation triggering conditions into consideration.

In summary, in the ES management method for a base station according to the embodiment of the present invention, the IRPManager initiates an ES enable/disable procedure or an ES activation/resumption procedure to the IRPAgent, which enables the operators to perform unified management on the ES procedure for the base station at a base station level or a cell level, and thus enhances the reliability and accuracy of an original ES operation triggering decision performed by the base station itself, so that the operators are provided with network-wide base station ES monitoring and base station ES strategy setting capabilities, which helps the operators to actively control the impact of the ES operation of the base station on the performance of the network.

An embodiment of the present invention also provides an ES method for a base station. The ES method includes:

setting, by a base station, an ES enable/disable attribute and/or an ES effective period attribute according to an ES enable/disable procedure initiated by a network management system; or performing, by the base station, an ES activation operation or an ES resumption operation according to the ES activation/resumption procedure initiated by the network management system, where the ES activation operation causes the base station or a cell controlled by the base station to go into an ES state, while the ES resumption operation causes the base station or the cell controlled by the base station to go out of the ES state.

The following two points should be noted:

(1) If the ES enable/disable attribute of a base station or a cell controlled by the base station is set to disabled, it is not allowed to set the ES effective period attribute of the base station or the cell controlled by the base station.

(2) The network management system may also directly set the ES effective period attribute of the base station or the cell controlled by the base station, without setting the ES enable/disable attribute of the base station or the cell controlled by the base station in advance; when the ES effective period is a valid time value, it denotes that an ES operation is allowed to be performed on the base station or the cell controlled by the base station, and when the ES effective period is not a valid time value, it denotes that an ES operation is not allowed to be performed on the base station or the cell controlled by the base station.

Optionally, when the base station receives an ES effective period sent by the network management system, the following ES activation/resumption operation is performed with reference to a base station's own ES operation triggering condition decision:

Within the set ES effective period, if a load of the base station or the cell controlled by the base station is less than a preset threshold, the base station performs an ES activation operation and goes into an ES state, and if the load of the base station or the cell controlled by the base station is not less than the preset threshold, the base station does not perform the ES activation operation and does not go into the ES state; or If the load of the base station or the cell controlled by the base station rises to a level higher than the preset threshold, or the ES effective period of the base station or the cell controlled by the base station reaches end time, the base station performs an ES resumption operation and goes out of the ES state.

Further, when the base station or the cell controlled by the base station goes into the ES state or goes out of the ES state, the base station sends a notification about ES state update to the network management system.

The notification about ES state update may be a dedicated notification about ES state update sent by the IRPAgent to the IRPManager at the Itf-N, where the notification about ES state update carries an eNBID or a cellID and a value of the ES state attribute; or The notification about ES state update may be an ES state update notification sent by the IRPAgent to the IRPManager through a notification integration reference point at the Itf-N.

It can be known from the foregoing that, in the ES method for a base station according to the embodiment of the present invention, the base station sets an ES enable/disable attribute and/or an ES effective period attribute according to an ES enable/disable procedure initiated by the network management system; or the base station performs an ES activation operation or an ES resumption operation according to an ES activation/resumption procedure initiated by the network management system, which enables operators to perform unified management on the ES procedure for the base station on a base station level object or a cell level object, and thus enhances reliability and accuracy of an original ES operation triggering decision performed by the base station itself, so that the operators are provided with network-wide base station ES monitoring and base station ES strategy setting capabilities, which helps the operators to actively control the impact of the ES operation of the base station on the performance of the network.

Based on the ES management method for a base station according to the embodiment of the present invention, an embodiment of the present invention also provides a network management system. Referring to FIG. 6, the network management system includes an IRPManager 100 and an IRPAgent 200, where management communication is performed between the IRPManager and the IRPAgent through an Itf-N 300. The IRPManager 100 initiates an ES enable/disable procedure or an ES activation/resumption procedure to the IRPAgent 200; the ES enable/disable procedure is used to allow or prohibit an ES operation on a base station or a cell; and the ES activation procedure is used to cause the base station or the cell to go into an ES state, while the ES resumption procedure is used to cause the base station or the cell to go out of the ES state.

When the IRPManager 100 allows an ES operation on the base station or the cell, the IRPManager 100 is also configured to send an ES effective period of the base station or a cell controlled by the base station to the IRPAgent 200.

Further, the IRPManager 100 is also configured to initiate an ES enable/disable procedure or an ES activation/resumption procedure through a dedicated ES operation command at the Itf-N 300.

Or, the IRPManager 100 is also configured to set an ES enable/disable attribute or an ES activation/resumption attribute for a base station function class or a generic cell class at the Itf-N 300, and set the ES enable/disable attribute or the ES activation/resumption attribute for the IRPAgent 200 through a Basic CM IRP or a Bulk CM IRP.

Reference may be made to the ES management method for a base station according to the embodiment of the present invention for more detailed ES management operation commands, which are not repeatedly described here.

It can be known from the foregoing that, the network management system according to the embodiment of the present invention performs an ES management operation at the Itf-N, which enables operators to perform unified management on the ES procedure for the base station on a base station level object or cell level object, and thus enhances reliability and accuracy of an original ES operation triggering decision performed by the base station itself, so that the operators are provided with network-wide base station ES monitoring and base station ES strategy setting capabilities, which helps the operators to actively control the impact of the ES operation of the base station on the performance of the network.

Figure 7:
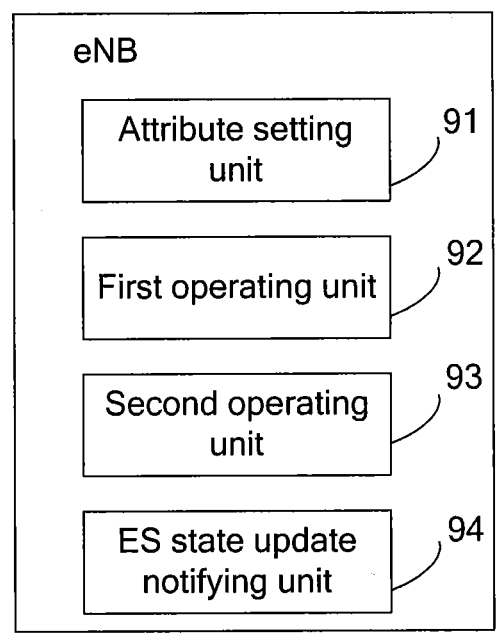
FIG. 7 is a schematic structural diagram of a base station according to an embodiment of the present invention.

Based on the ES method for a base station according to the embodiment of the present invention, an embodiment of the present invention also provides a base station. As shown in FIG. 7, the base station includes an attribute setting unit 91 and/or a first operating unit 92.

The attribute setting unit 91 is configured to set an ES enable/disable attribute and/or an ES effective period attribute according to an ES enable/disable procedure initiated by a network management system; and the first operating unit 92 is configured to go into or go out of an ES state according to an ES activation/resumption procedure initiated by the network management system.

Further, the base station may also include an ES state update notifying unit 94, configured to send a notification about ES state update to the network management system when the base station or a cell controlled by the base station goes into or goes out of an ES state.

Optionally, the base station may also include a second operating unit 93, configured, within the ES effective period set by the attribute setting unit 91, to perform an ES activation operation and go into the ES state if a load of the base station or the cell controlled by the base station is less than a preset threshold, and not to perform the ES activation operation and not to go into the ES state if the load of the base station or the cell controlled by the base station is not less than the preset threshold; or configured to perform an ES resumption operation and go out of the ES state if the load of the base station or the cell controlled by the base station rises to a level higher than the preset threshold, or the ES effective period of the base station or the cell controlled by the base station reaches end time.

The following two points shall be noted:

(1) When the ES enable/disable attribute set by the attribute setting unit 91 is disabled, it is prohibited to set the ES effective period attribute.

(2) The attribute setting unit 91 may also, instead of setting the ES enable/disable attribute, decide whether to perform an ES operation on the base station or the cell controlled by the base station by setting the ES effective period attribute. Specifically, when the ES effective period is a valid time value, it denotes that an ES operation is allowed for the base station or the cell controlled by the base station, and when the ES effective period is not a valid time value, it denotes that an ES operation is prohibited for the base station or the cell controlled by the base station.

It can be known from the foregoing that, the base station according to the embodiment of the present invention may enable operators to perform unified management on an ES procedure for the base station on a base station level object or a cell level object, and thus enhances reliability and accuracy of an original ES operation triggering decision performed by the base station itself, so that the operators are provided with network-wide base station ES monitoring and base station ES strategy setting capabilities, which helps the operators to actively control the impact of the ES operation of the base station on the performance of the network.

Finally, the following three points should be noted:

(1) The foregoing embodiments are described by taking only an LTE system as an example, but the ES management method for a base station and the ES method for a base station according to the embodiments of the present invention are not only applicable to an eNodeB in the LTE system, but also applicable to base stations in other communication systems, such as a UMTS NodeB or GSM BTS.

(2) During the ES procedure of a base station, the network management system is a participator in base station ES strategy management coordination facing overall resource conditions or performance monitoring conditions of the network, and may select a single base station or a batch of base stations according to a base station ES strategy of the operators, and perform an ES activation or ES resumption operation.

(3) The control object granularity of the network management system for the ES operation on a base station shall be limited to a base station level or a cell level, and a finer ES control object granularity (such as a channel and a radio frequency module) may be internally decided by the base station itself.

Those skilled in the art may further appreciate that the various illustrative units and implementation steps described in the embodiments disclosed here may be implemented by electronic hardware, computer software, or a combination of both. To clearly describe this interchangeability of hardware and software, various illustrative components and steps are described above generally in terms of their functionality. Whether such functionality is implemented by hardware or software depends upon the particular application and design constraints of the technical solutions. Those skilled in the art may implement the described functionality in varying ways for each particular application, but such implementation should not be interpreted as causing a departure from the scope of the present invention.

The method steps described in the embodiments disclosed here may be implemented by hardware, a software module executed by a processor, or a combination of the hardware and the software module executed by the processor. The software module may be disposed in a random access memory (RAM), a memory, a read only memory (ROM), an electrically programmable ROM, an electrically erasable programmable ROM, a register, a hard disk, a removable disk, a CD-ROM, or any other form of storage medium.

The foregoing embodiments are not intended to limit the present invention, and for those of ordinary skill in the art, any modification, equivalent substitution and improvement made without departing from the principles of the present invention shall be included in the scope of the present invention.

What is claimed is:

1. A method for facilitating energy management in a mobile communication network, comprising:

initiating, by a network manager entity (NM), an operation of enabling energy saving (ES) or an operation of disabling ES for a base station or a cell in the mobile communication network via a network element manager entity (NEM), the NM being responsible for operation, maintenance, and administration of the mobile communication network, the NEM being responsible for operation, maintenance, and administration of a plurality of network elements of the mobile communication network, the operation of enabling ES being designated for allowing the base station or the cell to perform an ES operation, and the operation of disabling ES being designated for prohibiting the base station or the cell to perform an ES operation; and receiving, by the NM, a notification sent by the NEM, the notification relating to an ES state of the base station or the cell.

2. The method according to claim 1, wherein the initiating comprises:

sending, by the NM, attribute information to the NEM via a northbound interface (Itf-N) between the NM and the NEM, the attribute information relating to the operation of enabling ES or the operation of disabling ES for the base station or the cell.

3. The method according to claim 2, wherein the attribute information is determined according to a strategy of an operator of the mobile communication network.

4. The method according to claim 1, wherein the initiating, comprises:

sending, by the NM, an ES effective period to the NEM, the ES effective period designating a time period during which an ES operation is allowed for the base station or the cell.

5. The method according to claim 4, wherein the ES effective period is determined according to a strategy of an operator of the mobile communication network.

6. The method according to claim 1, wherein the notification includes an identity of the base station or the cell.

7. The method according to claim 1, wherein the operation of enabling ES or the operation of disabling ES is initiated according to a strategy of an operator of the mobile communication network.

8. The method according to claim 7, wherein the strategy of the operator includes consideration of load statistics of the base station or the cell in a non-peak period.

9. The method according to claim 7, wherein the strategy of the operator includes consideration of a non-busy period of the base station or the cell.

10. The method according to claim 1, wherein the ES operation for the base station or the cell is activated when a load of the base station or the cell is lower than a preset threshold.

11. The method of claim 1, wherein the ES operation being allowed by the operation of enabling ES for the base station or the cell includes ES activation of the base station or the cell.

12. The method of claim 1, further comprising:

initiating, by the NM, an operation of ES activation for the base station or the cell via the NEM; and receiving, by the NM, a notification sent by the NEM, the notification relating to an ES state of the base station or the cell.

13. The method of claim 1, further comprising:

initiating, by the NM, an operation of ES resumption for the base station or the cell via the NEM; and receiving, by the NM, a notification sent by the NEM, the notification relating to an ES state of the base station or the cell.

14. A network management system for a mobile communication network, comprising a network manager entity (NM) in communication with a network element manager entity (NEM) via a northbound interface (Itf-N), the NM being responsible for operation, maintenance, and administration of the mobile communication network the NEM being responsible for operation, maintenance, and administration of a plurality of network elements of the mobile communication network, wherein the NM is configured to:

initiate an operation of enabling energy saving (ES) or an operation of disabling ES for a base station or a cell in the mobile communication network via the NEM, the operation of enabling ES being designated for allowing the base station or the cell to perform an ES operation, and the operation of disabling ES being designated for prohibiting the base station or the cell to perform an ES operation; and receive a notification sent by the NEM, the notification relating to ES state of the base station or the cell.

15. The network management system according to claim 14, wherein an ES effective period is sent by the NM to the NEM, the ES effective period designating a time period during which an ES operation is allowed for the base station or the cell.

16. The network management system according to claim 14, wherein the operation of enabling ES or the operation of disabling ES is initiated according to a strategy of an operator of the mobile communication network.

17. The network management system according to claim 16, wherein the strategy of the operator includes consideration of load statistics of the base station or the cell in non-peak period.

18. The network management system according to claim 16, wherein the strategy of the operator includes consideration of a non-busy period of the base station or the cell.

19. The network management system according to claim 14, wherein the ES operation for the base station or the cell is activated when a load of the base station or the cell is lower than a preset threshold.

20. The network management system according to claim 14, wherein the ES operation being allowed by the operation of enabling ES for the base station or the cell includes ES activation of the base station or the cell.

21. The network management system according to claim 14, wherein the NM is further configured to:

initiate, by the NM, an operation of ES activation for the base station or the cell via the NEM; and receive, by the NM, a notification sent by the NEM, the notification relating to an ES state of the base station or the cell.

22. The network management system according to claim 14, wherein the NM is further configured to:

initiate, by the NM, an operation of ES resumption for the base station or the cell via the NEM; and receive, by the NM, a notification sent by the NEM, the notification relating to an ES state of the base station or the cell.

23. A mobile communication network, comprising: a network manager entity (NM), a network element manager entity (NEM) and a base station, the NM being responsible for operation, maintenance, and administration of the mobile communication network, the NEM being responsible for operation, maintenance, and administration of a plurality of network elements of the mobile communication network, wherein the NM is configured to:

initiate an operation of enabling energy saving (ES) or an operation of disabling ES for the base station or a cell of the base station via the NEM, the operation of enabling ES being designated for allowing the base station or the cell to perform an ES operation, and the operation of disabling ES being designated for prohibiting the base station or the cell to perform an ES operation; and receive a notification sent by the NEM, the notification relating to ES state of the base station or the cell.

24. The mobile communication network according to claim 23, wherein the operation of enabling ES or the operation of disabling ES is initiated according to a strategy of an operator of the mobile communication network.

25. The mobile communication network according to claim 24, wherein the strategy of the operator includes consideration of a non-busy period of the base station or the cell.

26. The mobile communication network according to claim 23, wherein the ES operation for the base station or the cell is activated when a load of the base station or the cell is lower than a preset threshold.

* * * * *